UNITED STATES PATENT OFFICE.

FRITZ BENDER, OF MÜHLHEIM, GERMANY, ASSIGNOR TO FARBWERK MÜHLHEIM, VORMALS A. LEONHARDT & CO., OF SAME PLACE.

BLUE-BLACK DYE.

SPECIFICATION forming part of Letters Patent No. 606,438, dated June 28, 1898.

Application filed December 23, 1897. Serial No. 663,238. (Specimens.) Patented in England October 14, 1895, No. 19,253, and in France July 21, 1896, No. 258,853.

*To all whom it may concern:*

Be it known that I, FRITZ BENDER, chemist, doctor of philosophy, residing at Mühlheim-on-the-Main, Grand Duchy of Hessen, Germany, have invented new and useful Improvements in the Manufacture of Disazo Dyes, of which the following is a specification, and for which patents have been obtained in France, No. 258,853, dated July 21, 1896, and in Great Britain, No. 19,253, dated October 14, 1895.

My invention relates to greenish to bluish black coloring-matters suitable for dyeing wool and derived from one molecular proportion of 1.8 amidonaphthol 3.5 disulfo-acid, hereinafter termed "acid B," (which is prepared as is described in my application for United States patent, Serial No. 663,041, filed December 22, 1897,) by sulfonating 1.8 amidonaphthol 3 monosulfo-acid and two molecular proportions of diazo compounds. The combination is best effected in a solution rendered alkaline by carbonate of soda. In some cases it is advisable to employ solutions rendered alkaline by caustic-soda lye. The disazo dyes are generally less soluble than the monoazo dyes and can be separated from any unchanged monoazo dye by salting out in alkaline or acidulated solutions.

The new class of disazo coloring-matters dissolves in water with a reddish to greenish blue color and is insoluble (or nearly so) in spirit.

As disazo compounds which have proved to be useful for the purpose of this invention I especially mention those derived from anilin, toluidin, paranitranilin, paraämidoacetanilid, naphthylamin, sulfonilic acid, naphthionic acid, beta-naphthylamindisulfo-acid G, dehydrothiotoluidinsulfonic acid.

As an example for the way in which this invention is carried out in practice I give the following directions: One molecular proportion of anilin is diazotized in the usual way, and the solution of diazo-benzene chlorid is poured into a cold watery solution of one molecular proportion of the acid B, kept alkaline by carbonate of soda. After standing for some time one molecular proportion of diazotized paranitranilin is added in the cold, the solution being kept alkaline during the whole operation. The color of the solution turns to a deep blue. The disazo dye is easily isolated by salting out.

The coloring-matter has the following characteristics: It dissolves in water with a blue color. It is scarcely soluble in spirit. The solution in concentrated sulfuric acid has a bluish-green tint and when diluted with water yields a blue precipitate. The coloring-matter dyes wool in an acid-bath a bluish black.

By employing instead of the diazo compounds mentioned in the example other diazo compounds such as I have above enumerated the result will not be materially changed, inasmuch as a product will likewise result dyeing wool in an acid-bath a greenish to bluish black.

Now what I claim, and desire to secure by Letters Patent, is the following:

1. The disazo dyes derived from one molecular proportion of the herein-described "acid B" and two molecular proportions of a diazo compound such as diazo-benzene hereinabove mentioned, dissolving in water with a greenish to reddish blue color being insoluble or nearly so in spirit and dyeing wool in an acid-bath in greenish to bluish black shades.

2. The new dyestuff herein described and deriving from one molecular proportion of the "acid B" one molecular proportion of diazo-benzene and one molecular proportion of paranitrodiazo-benzene, having the formula

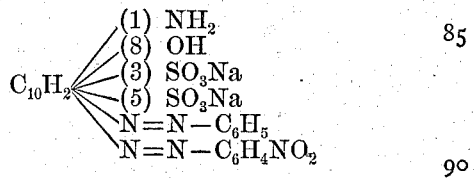

and which is soluble in water with a blue color but scarcely soluble in spirit, and the solution of which in concentrated sulfuric acid has a bluish-green tint and when diluted with water yields a blue precipitate; the said dyestuff dyeing wool in bluish-black shades.

In testimony whereof I have signed my name to this specification in the presence of two subscribing witnesses.

FRITZ BENDER.

Witnesses:
RICHARD WIRTH,
EVA SATTLER.